(12) United States Patent
Asselin et al.

(10) Patent No.: US 12,047,228 B2
(45) Date of Patent: Jul. 23, 2024

(54) EVENT REPORTING (71) Applicant: Apple Inc., Cupertino, CA (US)

(72) Inventors: Ramy R. Asselin, San Jose, CA (US);
John A. Wilkey, Sunnyvale, CA (US);
Jamie P. Carlson, San Jose, CA (US);
Stephanie L. Legault, Ottawa (CA);
Abdul Rahman Al-Shawa, San Jose,
CA (US); Anil K. Kandangath, San
Francisco, CA (US); George E.
Williams, Pleasanton, CA (US);
Jangwon Lee, San Jose, CA (US);
James D. Batson, Sunnyvale, CA (US);
Fabien Goncalves, San Francisco, CA
(US)

( * ) Notice: Subject to any disclaimer, the term of this patent is extended or adjusted under 35 U.S.C. 154(b) by 0 days.

(21) Appl. No.: 18/213,677

(22) Filed: Jun. 23, 2023

(65) Prior Publication Data

US 2024/0106700 A1 Mar. 28, 2024

Related U.S. Application Data (60) Provisional application No. 63/409,634, filed on Sep. 23, 2022.

(51) Int. Cl.
*H04L 41/0681* (2022.01)
*H04L 9/40* (2022.01)
(52) U.S. Cl.
CPC ...... *H04L 41/0681* (2013.01); *H04L 63/1408* (2013.01)
(58) Field of Classification Search
None
See application file for complete search history.

(56) References Cited

U.S. PATENT DOCUMENTS

| 6,548,997 B1* | 4/2003 | Bronfer ............ G04F 10/04 713/400 |
| 7,331,049 B1* | 2/2008 | Jin ................ G06Q 10/107 709/201 |
| 10,593,190 B2* | 3/2020 | Boettcher .......... G08B 19/00 |
| 2008/0196006 A1 | 8/2008 | Bates |
| 2010/0157828 A1* | 6/2010 | Oh ................ H04L 1/1825 370/252 |

(Continued)

FOREIGN PATENT DOCUMENTS

WO WO 2006/004378 1/2006

OTHER PUBLICATIONS

International Search Report and Written Opinion from PCT/US2023/028276, dated Oct. 12, 2023, 10 pages.

*Primary Examiner* — Lashonda Jacobs-Burton (57) ABSTRACT

The present disclosure generally relates to methods for sending event notifications. In some examples, a controller periodically sends messages concerning a status of an event corresponding to the controller. In some examples, at a first time while periodically sending the messages and in accordance with a determination that the status of the event has changed, the controller sends a message concerning data other than the status of the event. In some examples, at the first time while periodically sending the messages and in accordance with a determination that the status of the event has not changed, the controller continues to periodically send the messages without sending the message concerning data other than the status of the event.

33 Claims, 4 Drawing Sheets (56) References Cited

U.S. PATENT DOCUMENTS

| | | | |
|---|---|---|---|
| 2012/0179767 A1* | 7/2012 | Clarke | H04L 51/234 709/206 |
| 2013/0300564 A1* | 11/2013 | Lamb | G08B 25/008 340/573.4 |
| 2015/0131559 A1* | 5/2015 | Becker Hof | H04W 4/12 370/329 |
| 2019/0246296 A1* | 8/2019 | Hurst | H04W 12/08 |
| 2022/0137620 A1* | 5/2022 | Wolf | G05D 1/0027 701/2 |
| 2023/0351010 A1* | 11/2023 | Bivans | G06F 21/50 |

* cited by examiner

EVENT REPORTING

CROSS-REFERENCE TO RELATED APPLICATIONS

The present application claims benefit of U.S. Provisional Patent Application Ser. No. 63/409,634, entitled "EVENT REPORTING," filed on Sep. 23, 2022, which is hereby incorporated by reference in its entirety for all purposes.

BACKGROUND

Notifications of events are sent between different compute systems (e.g., controllers, computer systems, and/or devices) in a network. In some examples, notifications of events are constrained by the size of data that can be sent in a data frame in the network. Thus, limiting the amount of information that can be sent and associated with one or more events in the network. Accordingly, there is a need to send notifications concerning the status of the event and additional data that can be associated with one or more events in networks with size constraints.

SUMMARY

Current techniques for sending event notifications are generally ineffective for sending more complex and/or data intensive notifications (e.g., messages and/or information) in networks. This disclosure provides more effective and/or efficient techniques for sending event notifications. Such techniques optionally complement or replace other methods for sending event notifications.

In some examples, a method is described. In some examples, the method is performed at a processor of a controller. In some examples, the method comprises: periodically sending messages concerning a status of an event corresponding to the controller; and at a first time while periodically sending the messages: in accordance with a determination that the status of the event has changed, sending a message concerning data other than the status of the event; and in accordance with a determination that the status of the event has not changed, continuing to periodically send the messages without sending the message concerning data other than the status of the event.

In some examples, a non-transitory computer-readable storage medium storing one or more programs configured to be executed by one or more processors of a controller is described. In some examples, one or more programs include instructions for: periodically sending messages concerning a status of an event corresponding to the controller; and at a first time while periodically sending the messages: in accordance with a determination that the status of the event has changed, sending a message concerning data other than the status of the event; and in accordance with a determination that the status of the event has not changed, continuing to periodically send the messages without sending the message concerning data other than the status of the event.

In some examples, a transitory computer-readable storage medium storing one or more programs configured to be executed by one or more processors of a controller is described. In some examples, one or more programs include instructions for: periodically sending messages concerning a status of an event corresponding to the controller; and at a first time while periodically sending the messages: in accordance with a determination that the status of the event has changed, sending a message concerning data other than the status of the event; and in accordance with a determination that the status of the event has not changed, continuing to periodically send the messages without sending the message concerning data other than the status of the event.

In some examples, a controller is described. In some examples, the controller includes one or more processors; and memory storing one or more programs configured to be executed by the one or more processors. In some examples, one or more programs include instructions for: periodically sending messages concerning a status of an event corresponding to the controller; and at a first time while periodically sending the messages: in accordance with a determination that the status of the event has changed, sending a message concerning data other than the status of the event; and in accordance with a determination that the status of the event has not changed, continuing to periodically send the messages without sending the message concerning data other than the status of the event.

In some examples, a controller is described. In some examples, the controller comprises: means for periodically sending messages concerning a status of an event corresponding to the controller; and means, at a first time while periodically sending the messages, for: in accordance with a determination that the status of the event has changed, sending a message concerning data other than the status of the event; and in accordance with a determination that the status of the event has not changed, continuing to periodically send the messages without sending the message concerning data other than the status of the event.

In some examples, a computer program product is described. In some examples, the computer program product comprising one or more programs configured to be executed by one or more processors of a controller. In some embodiment, one or more programs include instructions for: periodically sending messages concerning a status of an event corresponding to the controller; and at a first time while periodically sending the messages: in accordance with a determination that the status of the event has changed, sending a message concerning data other than the status of the event; and in accordance with a determination that the status of the event has not changed, continuing to periodically send the messages without sending the message concerning data other than the status of the event.

The disclosure herein often describes an example of a controller sending messages to periodically report the status of different events in a network with a limited frame size. It should be understood that other types of devices, messages, networks may be used with techniques described herein to improve current techniques. For example, a server can periodically send (or send at one or more instances in time without a periodic nature) messages over the Internet to each device connected to the server with an IP address of other devices connected to the server. In such an example, the server can also send additional information in a different message when another device connects to the server.

DESCRIPTION OF THE FIGURES

For a better understanding of the various described embodiments, reference should be made to the Detailed Description below, in conjunction with the following drawings in which like reference numerals refer to corresponding parts throughout the figures.

DETAILED DESCRIPTION

The following description sets forth exemplary techniques, methods, parameters, systems, computer readable storage medium, and the like. It should be recognized, however, that such description is not intended as a limitation on the scope of the present disclosure. Instead, such description is provided as a description of exemplary embodiments.

Methods described herein can include one or more steps that are contingent upon one or more conditions being met. It should be understood that the steps of these methods can be repeated multiple times, such that all of the one or more conditions upon which the one or more steps are contingent can be satisfied in different repetitions of the method. For example, if a method requires performing a first step upon a determination that a condition is satisfied and a second step upon a determination that the condition is not satisfied, a person of ordinary skill in the art would appreciate that the steps of the method are repeated until the condition, in no particular order, has been satisfied (e.g., in one set of repetitions of the method) and not satisfied (e.g., in another set of repetitions of the method). Thus, a method described with steps that are contingent upon one or more conditions being satisfied could be rewritten as a method that is repeated until each of the conditions described in the method has been satisfied. This, however, is not required of system or computer readable medium claims where the system or computer readable medium claims contain instructions for performing one or more steps that are contingent upon one or more conditions being satisfied. Because the instructions for the system or computer readable medium claims are stored in one or more processors and/or at one or more memory locations, the system or computer readable medium claims contain logic that can determine whether or not the condition has been satisfied without explicitly repeating steps of a method until all of the conditions (upon which steps in the method are contingent) have been satisfied. A person having ordinary skill in the art would also understand that, similar to a method with contingent steps, a system or computer readable storage medium can repeat the steps of a method as many times as needed to ensure that all of the contingent steps have been performed.

Although the following description uses terms "first," "second," etc. to describe various elements, these elements should not be limited by the terms. In some examples, these terms are used to distinguish one element from another. For example, a first device could be termed a second device, and similarly, a second device could be termed a first device, without departing from the scope of the various described examples. In some examples, the first device and the second device are two separate references to the same device. In some examples, the first device and the second device are both devices, but they are not the same device or the same type of device.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event" or "in accordance with a determination that [the stated condition or event]," depending on the context.

Figure 1:
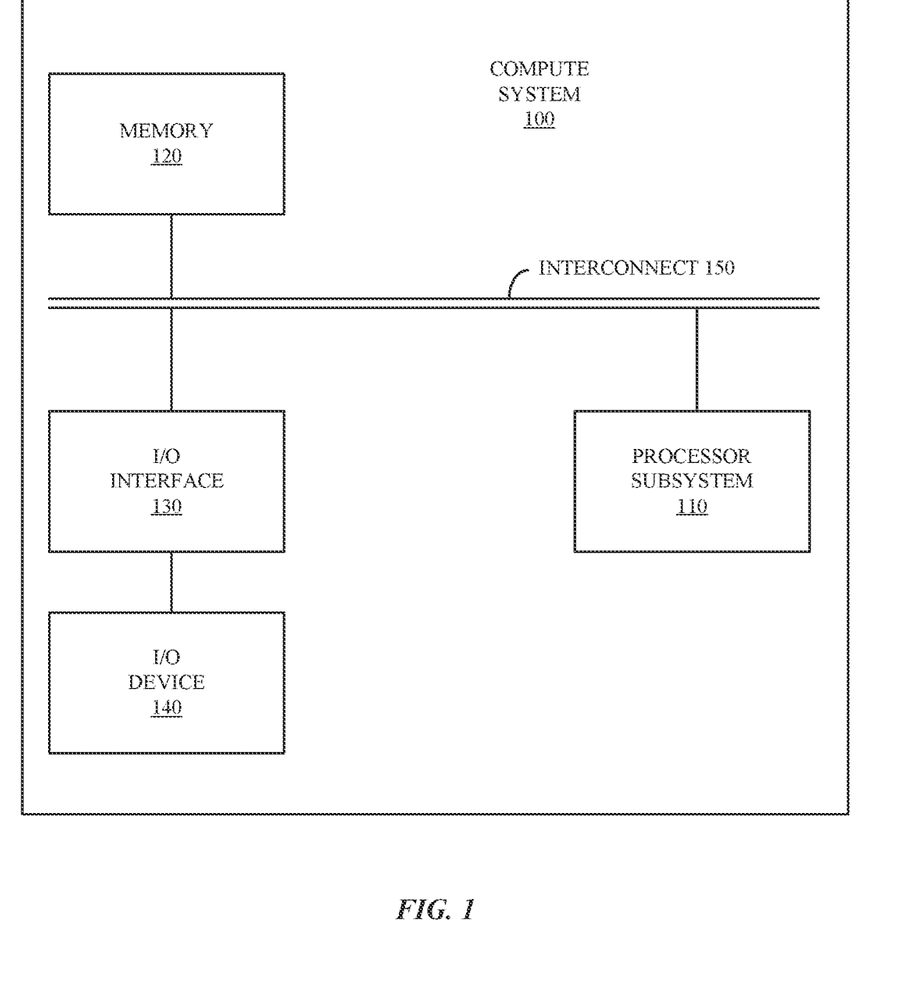
FIG. 1 is a block diagram illustrating a compute system.

Turning to FIG. 1, a block diagram of compute system 100 is illustrated. Compute system 100 is a non-limiting example of a compute system that can be used to perform functionality described herein. It should be recognized that other computer architectures of a compute system can be used to perform functionality described herein.

In the illustrated example, compute system 100 includes processor subsystem 110 coupled (e.g., wired or wirelessly) to memory 120 (e.g., a system memory) and I/O interface 130 via interconnect 150 (e.g., a system bus, one or more memory locations, or other communication channel for connecting multiple components of compute system 100). In addition, I/O interface 130 is coupled (e.g., wired or wirelessly) to I/O device 140. In some examples, I/O interface 130 is included with I/O device 140 such that the two are a single component. It should be recognized that there can be one or more I/O interfaces, with each I/O interface coupled to one or more I/O devices. In some examples, multiple instances of processor subsystem 110 can be coupled to interconnect 150.

Compute system 100 can be any of various types of devices, including, but not limited to, a system on a chip, a server system, a personal computer system (e.g., a smartphone, a smartwatch, a wearable device, a tablet, a laptop computer, and/or a desktop computer), a sensor, or the like. In some examples, compute system 100 is included with or coupled to a physical component for the purpose of modifying the physical component in response to an instruction. In some examples, compute system 100 receives an instruction to modify a physical component and, in response to the instruction, causes the physical component to be modified. In some examples, the physical component is modified via an actuator, an electric signal, and/or algorithm. Examples of such physical components include an acceleration control, a break, a gear box, a hinge, a motor, a pump, a refrigeration system, a spring, a suspension system, a steering control, a pump, a vacuum system, and/or a valve. In some examples, a sensor includes one or more hardware components that detect information about a physical environment in proximity to (e.g., surrounding) the sensor. In some examples, a hardware component of a sensor includes a sensing component (e.g., an image sensor or temperature sensor), a transmitting component (e.g., a laser or radio transmitter), a receiving component (e.g., a laser or radio receiver), or any combination thereof. Examples of sensors include an angle sensor, a chemical sensor, a brake pressure sensor, a contact sensor, a non-contact sensor, an electrical sensor, a flow sensor, a force sensor, a gas sensor, a humidity sensor, an image sensor (e.g., a camera sensor, a radar sensor, and/or a lidar sensor), an inertial measurement unit, a leak sensor, a level sensor, a light detection and ranging system, a metal sensor, a motion sensor, a particle sensor, a photoelectric sensor, a position sensor (e.g., a global positioning system), a precipitation sensor, a pressure sensor, a proximity sensor, a radio detection and ranging system, a radiation sensor, a speed sensor (e.g., measures the speed of an object), a temperature sensor, a time-of-flight sensor, a torque sensor, and an ultrasonic sensor. In some examples, a sensor includes a combination of multiple sensors. In some examples, sensor data is captured by fusing data from one sensor with data from one or more other sensors. Although a single compute system is shown in FIG. 1, compute system 100 can also be implemented as two or more compute systems operating together.

In some examples, processor subsystem 110 includes one or more processors or processing units configured to execute program instructions to perform functionality described herein. For example, processor subsystem 110 can execute an operating system, a middleware system, one or more applications, or any combination thereof.

In some examples, the operating system manages resources of compute system 100. Examples of types of operating systems covered herein include batch operating systems (e.g., Multiple Virtual Storage (MVS)), time-sharing operating systems (e.g., Unix), distributed operating systems (e.g., Advanced Interactive eXecutive (AIX)), network operating systems (e.g., Microsoft Windows Server), and real-time operating systems (e.g., QNX). In some examples, the operating system includes various procedures, sets of instructions, software components, and/or drivers for controlling and managing general system tasks (e.g., memory management, storage device control, power management, or the like) and for facilitating communication between various hardware and software components. In some examples, the operating system uses a priority-based scheduler that assigns a priority to different tasks that processor subsystem 110 can execute. In such examples, the priority assigned to a task is used to identify a next task to execute. In some examples, the priority-based scheduler identifies a next task to execute when a previous task finishes executing. In some examples, the highest priority task runs to completion unless another higher priority task is made ready).

In some examples, the middleware system provides one or more services and/or capabilities to applications (e.g., the one or more applications running on processor subsystem 110) outside of what the operating system offers (e.g., data management, application services, messaging, authentication, API management, or the like). In some examples, the middleware system is designed for a heterogeneous computer cluster to provide hardware abstraction, low-level device control, implementation of commonly used functionality, message-passing between processes, package management, or any combination thereof. Examples of middleware systems include Lightweight Communications and Marshalling (LCM), PX4, Robot Operating System (ROS), and ZeroMQ. In some examples, the middleware system represents processes and/or operations using a graph architecture, where processing takes place in nodes that can receive, post, and multiplex sensor data messages, control messages, state messages, planning messages, actuator messages, and other messages. In such examples, the graph architecture can define an application (e.g., an application executing on processor subsystem 110 as described above), such that different operations of the application are included with different nodes in the graph architecture.

In some examples, a message sent from a first node in a graph architecture to a second node in the graph architecture is performed using a publish-subscribe model, where the first node publishes data on a channel in which the second node is able to subscribe. In such examples, the first node can store data in memory (e.g., memory 120 or some local memory of processor subsystem 110) and notify the second node that the data has been stored in the memory. In some examples, the first node notifies the second node that the data has been stored in the memory by sending a pointer (e.g., a memory pointer, such as an identification of a memory location) to the second node so that the second node can access the data from where the first node stored the data. In some examples, the first node would send the data directly to the second node so that the second node would not need to access a memory based on data received from the first node.

Memory 120 can include a computer readable medium (e.g., non-transitory or transitory computer readable medium) usable to store (e.g., configured to store, assigned to store, and/or that stores) program instructions executable by processor subsystem 110 to cause compute system 100 to perform various operations described herein. For example, memory 120 can store program instructions to implement the functionality associated with the flow described in FIG. 4.

Memory 120 can be implemented using different physical, non-transitory memory media, such as hard disk storage, floppy disk storage, removable disk storage, flash memory, random access memory (RAM-SRAM, EDO RAM, SDRAM, DDR SDRAM, RAMBUS RAM, or the like), read only memory (PROM, EEPROM, or the like), or the like. Memory in compute system 100 is not limited to primary storage such as memory 120. Compute system 100 can also include other forms of storage, such as cache memory in processor subsystem 110 and secondary storage on I/O device 140 (e.g., a hard drive, storage array, etc.). In some examples, these other forms of storage can also store program instructions executable by processor subsystem 110 to perform operations described herein. In some examples, processor subsystem 110 (or each processor within processor subsystem 110) contains a cache or other form of on-board memory.

I/O interface 130 can be any of various types of interfaces configured to couple to and communicate with other devices. In some examples, I/O interface 130 includes a bridge chip (e.g., Southbridge) from a front-side bus to one or more back-side buses. I/O interface 130 can be coupled to one or more I/O devices (e.g., I/O device 140) via one or more corresponding buses or other interfaces. Examples of I/O devices include storage devices (hard drive, optical drive, removable flash drive, storage array, SAN, or their associated controller), network interface devices (e.g., to a local or wide-area network), sensor devices (e.g., camera, radar, lidar, ultrasonic sensor, GPS, inertial measurement device, or the like), and auditory or visual output devices (e.g., speaker, light, screen, projector, or the like). In some examples, compute system 100 is coupled to a network via a network interface device (e.g., configured to communicate over Wi-Fi, Bluetooth, Ethernet, or the like). In some examples, compute system 100 is directly or wired coupled to the network.

Figure 2:
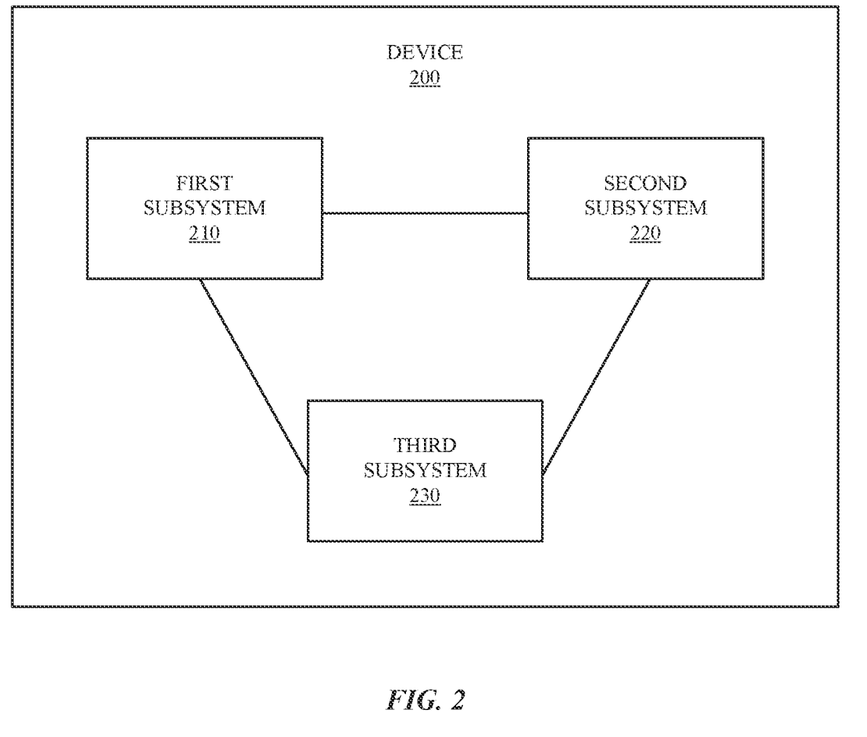
FIG. 2 is a block diagram illustrating a device with interconnected subsystems.

FIG. 2 illustrates a block diagram of device 200 with interconnected subsystems. In the illustrated example, device 200 includes three different subsystems (i.e., first subsystem 210, second subsystem 220, and third subsystem 230) coupled (e.g., wired or wirelessly) to each other. An example of a possible computer architecture of a subsystem as included in FIG. 2 is described in FIG. 1 (i.e., compute system 100). Although three subsystems are shown in FIG. 2, device 200 can include more or fewer subsystems.

In some examples, some subsystems are not connected to other subsystem (e.g., first subsystem 210 can be connected to second subsystem 220 and third subsystem 230 but second subsystem 220 cannot be connected to third subsystem 230). In some examples, some subsystems are connected via one or more wires while other subsystems are wirelessly connected. In some examples, messages are set between the first subsystem 210, second subsystem 220, and third subsystem 230, such that when a respective subsystem sends a message the other subsystems receive the message (e.g., via a wire and/or a bus). In some examples, one or more subsystems are wirelessly connected to one or more compute systems outside of device 200, such as a server system. In such examples, the subsystem can be configured to communicate wirelessly to the one or more compute systems outside of device 200.

In some examples, device 200 includes a housing that fully or partially encloses subsystems 210-230. Examples of device 200 include a home-appliance device (e.g., a refrigerator or an air conditioning system), a robot (e.g., a robotic arm or a robotic vacuum), and a vehicle. In some examples, device 200 is configured to navigate (with or without user input (e.g., direct user input or indirect user input)) in a physical environment.

In some examples, one or more subsystems of device 200 are used to control, manage, and/or receive data from one or more other subsystems of device 200 and/or one or more compute systems remote from device 200. For example, first subsystem 210 and second subsystem 220 can each be a camera that captures images, and third subsystem 230 can use the captured images for decision-making. In some examples, at least a portion of device 200 functions as a distributed compute system. For example, a task can be split into different portions, where a first portion is executed by first subsystem 210 and a second portion is executed by second subsystem 220.

Attention is now directed towards techniques for sending event notifications in a network. In particular, the techniques provide event notifications by sending periodic messages concerning a status associated with the event and a payload message that is sent when a rising and/or falling edge is detected for the event during the periodic sending of messages. A status associated with an event can be (or include) a status, such as a front door being opened/closed, a light being on/off, and/or a cooling system being on/off, and messages concerning the status can be sent while the event is occurring (e.g., while the door is opened, while the light is on, while the cooling system is off, etc.). A payload message is a message containing additional information about the status associated with the event. In some examples, the payload message does not include the status of the event. In some examples, the presence of the payload message implies that the event occurred.

The techniques discussed herein can provide event notifications in a limited bandwidth network and/or a network where the maximum size of a data frame is limited to a certain number of bytes (e.g., 8-64 bytes). A data frame is a collection of data, which includes the message. In some examples, the collection of data includes multiple bits representing a start-of-frame, an arbitration identifier, an identifier extension, a remote transmission request, a data length code, a data field, a cyclic redundancy check, an acknowledgement, and/or a channel signal. As used herein, the term "message" is used to describe the content of data stored as a part of data field of a data frame. In some examples, the techniques herein improve on existing networks, where only data frames with a limited size can be sent by compute systems (and/or controllers) within the network by allowing the compute systems to send data frames with additional information concerning an event and providing a technique to allow the data frames with the additional information concerning an event to be linked to periodic messages concerning the status of an event. It should be understood that other types of systems and other ways to define an event notification, method, and/or network are within scope of this disclosure and may benefit from techniques described herein. For example, the network is a home network or a device (e.g., a vehicle, phone, and/or beacon) network.

Figure 3:
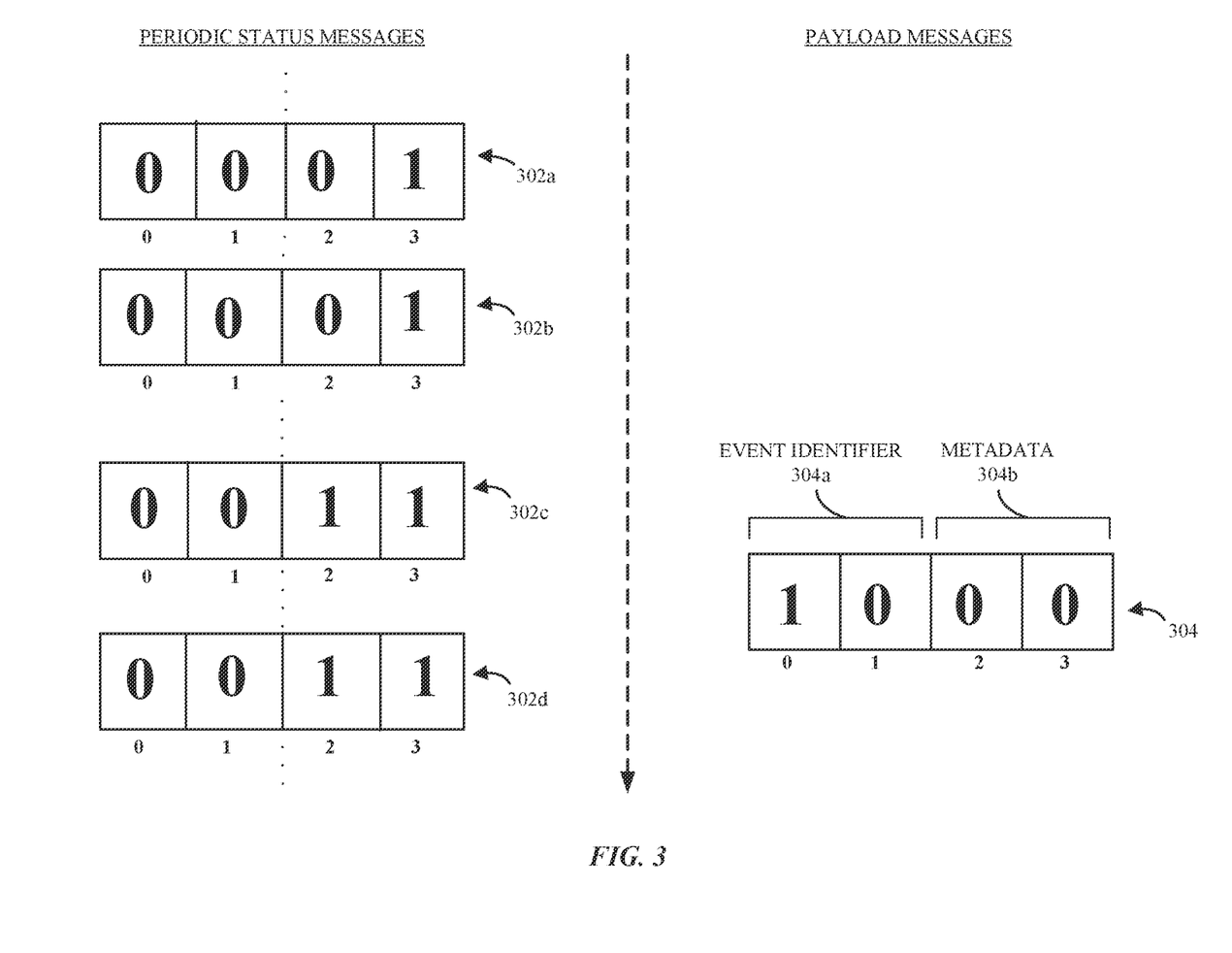
FIG. 3 is a block diagram illustrating exemplary message portions concerning to an event.

FIG. 3 is a block diagram illustrating exemplary message portions concerning an event. In particular, FIG. 3 illustrates examples of periodic status messages (e.g., messages corresponding to the status of one or more events) being sent periodically and a payload message (e.g., message corresponding to data other than the status of one (and/or at least one) of the one or more events) that is sent in response to a state or status of an event changing (e.g., an event occurring, a fault occurring, an operation being performed by software and a result of the operation exceeding a threshold, a sensor detecting that an event has occurred, a controller receiving an indication that an event has occurred, and/or a controller determining that an event occurred based on data detected by a sensor). FIG. 3 illustrates periodic status messages 302a-302d. Each of periodic status messages 302a-302d is sent by a controller. Each of status messages 302a-302d is included in a different data frame that is sent in a network. In some examples, the controller is in a device and configured to communicate with other controllers of the device (e.g., compute system 100 and/or device 200). In some examples, the device and controller include one or more features as described above in relation to compute system 100 and/or device 200. In some examples, as a part of the controller detecting an event, the controller receives an indication from a sensor that detected the event. In some examples, a controller is a subsystem of another device and includes one or more features of first subsystem 210, second subsystem 220, and third subsystem 230 described above in relation to FIG. 2. In some examples, the controller sends the periodic status messages and the payload message to report information concerning an event to other components of the respective device. In some examples, the controller reports the information via a physical wire and/or bus to other controllers and/or devices. In some examples, the controller and/or devices that receives the reported information stores the reported information. In some examples, the controller that reports the information causes the information to be stored in database.

At FIG. 3, the size of the data frame is determined by the network, but each data frame is the same size for the sake of the example provided in FIG. 3. For exemplary purposes, each of periodic status messages 302a-302d are four bits. However, the periodic status messages can be a different size in a particular network, which is a size that is smaller than the size of the data frame allowed by the network (e.g., the data frame in which a respective periodic status message is sent). At FIG. 3, payload message 304 is sent in a data frame that is the same size as the data frames that include periodic status messages 302a-302d. Payload message 304 is also four bits for exemplary purposes but can be a different size in a particular network, which is the size that is smaller than the size of the data frame allowed by the network. In some examples, the size of payload message 304 is the same size as periodic status messages 302a-302d. In some examples, the data frames that contain periodic status messages 302a-302d also contain an identifier field with the same bit sequence to indicate that periodic status messages 302a-302d are status messages. In some examples, the data frame that contains payload message 304 also contains an identifier field with a bit sequence that is different from the identifier field of the periodic status messages to indicate that payload message 304 is a payload message.

Periodic status messages 302a-302d includes bits that are located at different indexes (0-3) to represent a respective periodic status message. Each index (e.g., 0-3) of messages 302a-302d corresponds to a different event different sensors and/or faults in the network that are monitored by a controller. For example, index 0 of periodic status messages 302a-302d corresponds to a first event detected by a first sensor (e.g., a front door open/close event) (or, in some embodiments, a first set of one or more sensors); index 1 of messages 302a-302d corresponds to a second event at a second sensor (e.g., a back door open/close event); index 2 of messages 302a-302d corresponds to a third event at a third sensor (e.g., a front light on/off event); and index 3 of messages 302a-302d corresponds to a fourth event at a fourth sensor (e.g., a back light on/off event). The value of the bit at a respective index (e.g., 0 or 1) communicates the status of the event. For example, "0" at index 0 of periodic status message 302a can indicate that a door is closed (if index 0 corresponds to a door on/off event); "0" at index 1 of period status message 302a can indicate that a light is off (if index 1 corresponds to a light on/off event); "0" at index 2 of periodic status message 302a can indicate that a fan is off (if index 2 corresponds to a fan on/off event); and "1" at index 3 of periodic status message 302a can indicate that a speaker is on (if index 3 corresponds to a speaker on/off event). In some examples, one or more of the first, second, third, and fourth sensors are the same sensors. In some examples, one or more of the first, second third, and fourth sensors are different sensors.

At FIG. 3, payload message 304 includes event identifier portion 304a and metadata portion 304b. Event identifier portion 304a denotes an event to which payload message 304 is related, and metadata portion 304b denotes additional information concerning the event to which payload message 304 is related. As illustrated in FIG. 3, payload message 304 includes "1 0" (e.g., 2) in event identifier portion 304a, which in binary indicates that payload message 304 is related to the event that corresponds to index 2 of periodic status messages 302a-302d. On the other hand, payload message 304 does not include "0 0" in event identifier portion 304a because payload message 304 is not related to the event that corresponds to index 0 of periodic status messages 302a-302d. In some examples, the bits of event identifier portion point to the discriminator bit in the periodic status messages 302a-302d (e.g., masked, inverted, and/or inversed bits and/or a bit that changes at a particular index that corresponds to a particular event). In some examples, the bits of event identifier portion 304a can be represented differently such as in bytes and/or trits (e.g., in ternary).

At FIG. 3, payload message 304 is sent after status message 302c because a rising edge ("0" to "1") was detected between the sending of periodic status message 302b and 302c. As illustrated in FIG. 3, the rising edge is identified by the bit at index 2 changing from 0 to 1. On the other hand, a payload message that includes "0 0" in event identifier portion 304a is not sent because a rising or falling edge (e.g., an event change) was not detected at the event corresponding to index 0 (e.g., index 0 did not change from 0 to 1 in messages 302a-302d). In some examples, payload message 304 is sent when a falling edge is detected at index 2 between multiple periodic status messages (e.g., a decrease in a bit between the periodic status messages, such as changing from 1 to 0). In some examples, a different payload message is sent when a rising edge and/or falling edge is detected between periodic status messages with respect to an index other than index 2, where the different payload message includes an indication of the respective index in event identifier portion 304a. In some examples, event identifier 304 is included at the same respective indexes in different payload messages so that a receiving device can quickly associate a payload message with a group of status messages. In some examples, rising and/or falling edges can be detected for indexes corresponding to different events between multiple status messages (e.g., two status messages, three status messages, etc.), and separate payload messages corresponding to each of the different event can be sent to provide additional information concerning each event. In such examples, the separate payload messages can reference the index of different events in each of their respective event identifier portions.

In some examples, payload messages can be sent periodically, but at a lower frequency than the frequency at which the periodic status messages are sent. As an example, the payload messages can be sent once every minute while the status messages can be sent once every second. As another example, the payload messages can be sent once every thirty seconds while the status messages can be sent once every 3 seconds. In some examples, multiple payload messages can be sent periodically in addition to one or more payload messages being sent on the rising or falling edge (as discussed above).

In some examples, the period status messages and/or payload messages are transmitted and/or stored via a channel that is determined to be reliable or secure, as opposed to being transmitted and/or stored via a channel that is not determined to be reliable or secure. In some examples, the status messages and/or payload messages can be compressed by a form of lossless data compression, such as a type of run-length encoding (e.g., when the status and/or payload messages are transmitted and/or stored via a channel that is determined to be reliable or secure).

While FIG. 3 discusses messages that are represented in binary, it should be understood that in a different example, the messages can be represented in other ways, such as in tertiary, and the techniques discussed above can be used to send and receive payload messages and to periodically send and receive status messages in this example.

Figure 4:
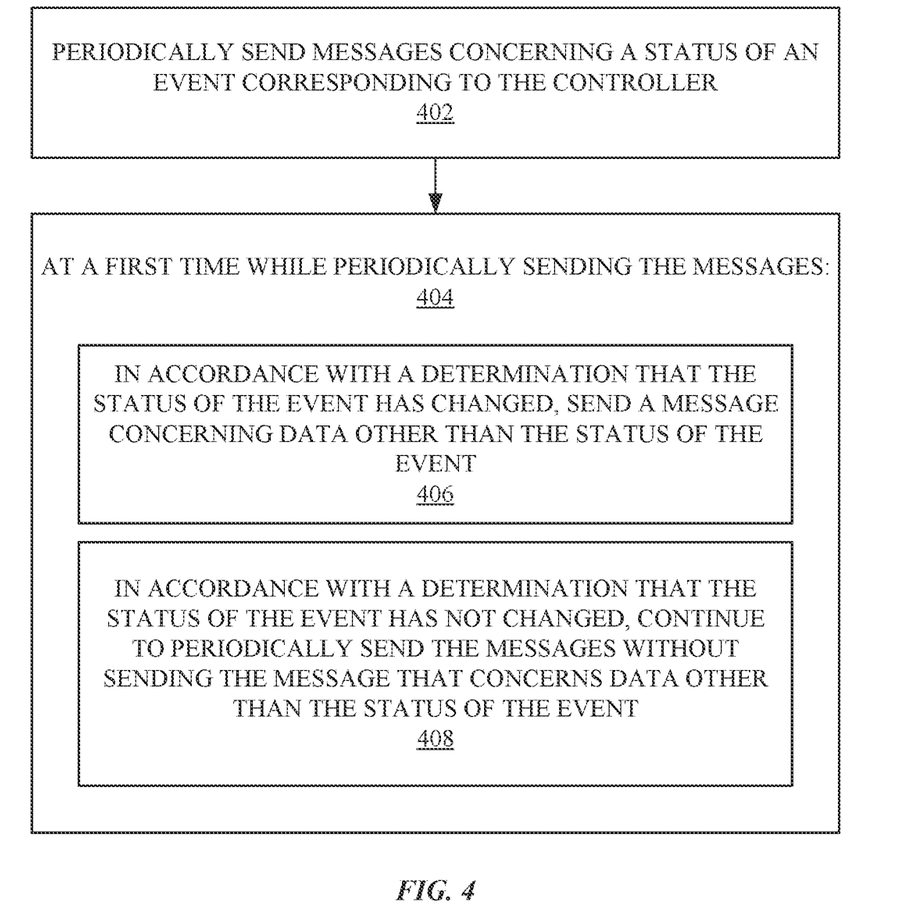
FIG. 4 is a flow diagram illustrating a method for sending event notifications.

FIG. 4 is a flow diagram illustrating method 400. In some examples, method 400 is a method for providing event notifications. Some operations in method 400 are, optionally, combined; the orders of some operations are, optionally, changed; and some operations are, optionally, omitted. In some examples, method 400 is performed by a processor of a controller (e.g., computer system 100). In some examples, the processor is a processing unit (e.g., one or more processors). In some examples, the processing unit is a computer processing unit or a graphical processing unit. In some examples, a controller is a computer system, a phone, a tablet, a wearable device, a sensor, a subsystem, a fault detection unit, and/or a control unit. In some examples, the control unit is an engine control unit, a device control unit, an electronic control module, and/or sensor control unit.

At block 402, the controller periodically sends messages (e.g., 302a-302b or 302c-302d) concerning a status of an event corresponding (e.g., about, encapsulating, and/or containing) to the controller ("periodic status messages"). In some examples, as a part of periodically sending messages, the controller sends one or more messages at a certain interval (e.g., every 1-60 seconds over a period of time). In some examples, the controller sends the messages without the status of an event changing and/or irrespective of whether the status of an event. In some examples, the status includes a status to open door, close door, speed above/below a certain speed, light on, light off, active, and/or inactive. In some examples, the event is an event that has occurred at the controller, an event concerning the state of the controller (e.g., the controller being moved and/or turned off/on), and/or an event concerning data detected by the controller. In some examples, the messages are periodically sent over a network, such as a wired network and/or a wireless network. In some examples, the messages are sent to one or more other controllers and/or devices. In some examples, the other controllers and/or devices are devices that can send and receive and/or only receive messages. In some examples, the controller receives a status from a state machine, a fault detector, and/or a process in communication with and/or executing via the controller and the event is based on the received state. In some examples, the controller detects and/or is reporting the status of events received from input/output signals from sensors and/or actuators. In some examples, the status of the event is binary, ternary, etc.

At blocks 404 and 406, at a first time while periodically sending the messages (e.g., between sending two subsequent messages in the messages and/or before or after sending a message of the messages) (and/or at a first time during the periodic sending of the messages) and in accordance with a determination that the status of the event has changed, the controller sends a message (e.g., 304) concerning data other than the status of the event ("payload message"). In some examples, as a part of determining that the status of the event has changed, the controller (or another controller) detects a rising edge of a signal or detecting a falling edge of the signal. In some examples, the signal is an electrical signal and/or a high, open, low, and/or closed indication and/or signal. In some examples, the signal corresponds to one or more of the messages concerning the status of the event and/or to one or more of the messages concerning the status of the event. In some examples, determining that the status of the event has changed includes detecting a message from the controller that sent the periodic status messages, where the message associated the event with a different status than the status of the event. In some examples, determining that the status of the event has changed includes detecting a message concerning a new event. In some examples, determining that the status of the event has changed includes detecting a message concerning a new event without detecting the message associated the event with a different status than the status of the event. In some examples, the message concerning data other than the status of the event is a payload message and/or a message that is not periodically sent. In some examples, the data other than the status of the event is additional data and/or information that is not about a single status of the event and/or holistic data and/or information concerning multiple event statuses. In some examples, the additional data includes data that communicates how long (e.g., door was opened for 20 minutes), how many times, and/or how fast a door was opened when the status of the event sent in the periodic status messages communicated that the door was opened or closed at a particular instance in time. In some examples, the additional data includes data that communicates how long and/or how many times (e.g., light turned on and off 50 times) a light was turned on and/or how bright a light was when the status of the periodic status messages communicated that the light was off or on at a particular instance in time. In some examples, the additional data includes data that communicates how long and/or how fast a computer system was traveling (e.g., or speed that computer system) is traveling is 20 meters per second when the status of the periodic messages communicated that the computer system was over or under the speed of 50 miles per hour at a particular instance in time. In some examples, the controller ceases to periodically send the messages concerning the status of the event after sending the message concerning data other than the status of the event. In some examples, after sending the message concerning data other than the status of the event, the controller ceases to periodically send the messages concerning the status of the event while continuing to periodically send one or more messages concerning one or more statuses that correspond to one or more other events.

At blocks 404 and 408, at a first time while periodically sending the messages (e.g., between sending two subsequent messages in the messages and/or before or after sending a message of the messages) (and/or at a first time during the periodic sending of the messages) and in accordance with a determination that the status of the event has not changed, the controller continues to periodically send the messages without sending the message concerning data other than the status of the event (and/or a message that includes data other than the status of the event and/or without sending a payload message). In some examples, the payload message(s) is not sent periodically. In some examples, the message concerning data other than the status of the event is not periodically sent (and/or is not resent). In some examples, messages concerning data other than one or more statues of one or more events are in (e.g., stored in and/or located in) a first buffer (and, in some examples, not stored in the second buffer) and messages concerning one or more statuses of one or more events are in second buffer (and, In some examples, not stored in the first buffer) that is different from the first buffer. In some examples, the first buffer is a different size than (e.g., smaller than or larger than) the second buffer. In some examples, messages in the first buffer are removed and/or replaced (e.g., due to lack of buffer and/or memory space) and are not re-added to the first buffer. In some examples, messages in the second buffer are replaced and/or re-added to the second buffer. In some examples, the first buffer is a circular buffer, and the second buffer is not a circular buffer. In some examples, the controller is coupled to other controllers (e.g., a computer system, a phone, a tablet, a wearable device, a sensor, a fault detection unit, and/or a control unit (e.g., an engine control unit, a device control unit, and/or sensor control unit)) in a wired network (e.g., the wired network is a controller area network and/or a network that includes a bus and/or a communication bus). In some examples, the messages concerning the status of the event corresponding to the controller and the message concerning data other than the status of the event are sent to the other controllers via the wired network.

In some examples, the index of the masked bit in one or more of the periodic status messages corresponds to a value of a discriminator in the messages concerning data other than the status of the event. In some examples, the messages concerning the status of the event corresponding to the controller includes a first message and/or a second message, a third message, a fourth message, etc. In some examples, the first message includes a respective bit of a plurality of bits (e.g., binary bits, ternary bits, etc.) at a respective index. In some examples, the respective bit (e.g., one or more respective bits) is one or more masked bits, one or more inverted bits, and/or one or more inversed bit. In some examples, the respective index is an index of a data structure, such as an array or list. In some examples, the respective index is the first bit, the second bit, or the nth bit in the first message. In some examples, the messages concerning data other than the status of the event includes an indication of (e.g., corresponding to) the respective index. In some examples, the indication of the respective index is at and/or represented by one or more bits in the message other than the status of the event that is not at the same index in the messages concerning the status of the event as the respective index and/or does not correspond to the same bit with respect to the message other than the status of the event (and/or positioned in the message other than the status of the event at the same location) as the respective bit with respect to the first message.

In some examples, the controller sends and/or receives non-related messages that do not include the index of the masked as a value of the discriminator bit. In some examples, the controller processes (e.g., sends and/or receives) a message concerning a second status of a second event that is different from the event. In some examples, the message concerning the second status of the second event does not include the respective bit at the respective index. In some examples, the message concerning the second status of the second event corresponds to the controller or a different controller than the controller. In some examples, the controller processes the message concerning the second status of the second event while, during, after, and/or before periodically sending the messages concerning the status of the event corresponding to the controller and/or at a second time while periodically sending the message, where the second time is different from the first time. In some examples, the message concerning the second status of the second event includes the respective bit at an index that is different from the respective index. In some examples, the message concerning the second status of the second event includes a bit that is different from the respective bit (e.g., a different masked bit and/or a different inversed and/or flipped bit) at an index that is different form the respective index. In some examples, the second status is the same as the status and the event is different from the second event. In some examples, the second status is different from the status and the event is the same as the second event (or the event is different from the second event). In some examples, the message concerning the second status of the event is periodically sent (and/or sent with messages concerning the second status of the second event). In some examples, a message concerning data other than the second status of the second event is sent in accordance with a determination that the second status of the second event has changed. In some examples, in accordance with a determination that the second status of the second event has changed, the message concerning data other than the status of the event is not sent and the message concerning data other than the second status of the second event is sent. In some examples, in accordance with a determination that the status of the event has changed, the message concerning data other than the status of the event is sent and the message concerning data other than the second status of the second event is not sent.

In some examples, messages related to the second event follow the same data conventions as the periodic status messages related to the event but does follow the same as the messages concerning data other than the status of the event. In some examples, the message concerning the second status of the second event is formatted with respect to a respective set of message conventions. In some examples, the set of message conventions is a first data convention and/or a first data format (e.g., a first number of bits for identifier and/or a masked bit at a particular index, a second number of bits for messages, and/or a third number of bits for other data). In some examples, the message concerning the status of the event is formatted with respect to the respective set of message conventions. In some examples, the message concerning data other than the status of event is not formatted with respect to the respective set of message conventions. In some examples, the message concerning data other than the status of event is formatted with respect to a second set of message conventions that is different from the respective set of message conventions. In some examples, the message concerning the second status of the second event, the message concerning the status of the event, and the message concerning data other than the status of the event are the same size (e.g., 8-64 bytes as described above). In some examples, the message concerning the second status of the second event are detected by the same controller as the periodic status message concerning the status of the event. In some examples, the second event corresponds to the controller. In some examples, the second event is detected by the same controller as the event to which the periodic status messages correspond. In some examples, the second event corresponds to an event detected by a controller that is different from the controller.

In some examples, the periodic status messages concerning the status of the event corresponding to the controller include identifiers for different payload messages. In some examples, the messages concerning the status of the event corresponding to the controller include a second message. In some examples, the second message includes a first bit at a first index and a second bit at a second index that is different from the first index. In some examples, the first bit is different from the second bit. In some examples, the message (e.g., a first payload message that is different from the second message and/or any of the other messages concerning the status of the event corresponding to the controller) concerning data other than the status of the event includes an indication of the first index. In some examples, the message concerning data other than the status of the event does not include one or more indicates of the second index, the first bit, and/or the second bit. In some examples, a third message (e.g., a second payload message that is different from the first payload message, the second message, and/or any of the other messages concerning the status of the event corresponding to the controller) includes an indication of the second index. In some examples, the third message does not include one or more indication of the first index, the first bit, and/or the second bit. In some examples, the third message includes data other than the status of the status of the event and/or other than a status of another event.

In some examples, as a part of sending the periodic message concerning the status of the event, the controller sends multiple messages that have the same masked bit that is indexed. In some examples, each of the messages concerning the status of the event corresponding to the controller includes a masked bit that is at the same index in each of the messages. In some examples, the message concerning data other than the status of the event includes the indication of the same index. In some examples, the message concerning data other than the status of the event does not include an indication of the masked bit.

In some examples, the controller periodically sends a message that is not related to the event while periodically sending the messages concerning the status of the event. In some examples, while periodically sending messages concerning the status of the event corresponding to the controller, the controller processes (e.g., sends and/or receives) a message concerning a third status of a third event corresponding to the controller. In some examples, the third event is a different type of event than the event and the third event is not associated with the status of the event. In some examples, the message concerning the third status of the third event has a different index masked bit than the index of the masked bit of messages corresponding the status of the event. In some examples, the third event is a different type of event than the event and the third event is not associated with the status of the event. In some examples, the message concerning the third status of the third event has a different index masked bit than the index of the masked bit of messages corresponding the status of the event. In some examples, the message concerning the third status of the third event does not include the status of the event corresponding to the controller and does not concern respective data that is different from the data corresponding to the status of the event. In some examples, the message concerning the third status of the third event includes data other than the status of the third event.

In some examples, a receiving controller can receive the periodic status messages (e.g., messages corresponding to the status of the event) and payload messages (e.g., messages corresponding to data other than the status of the event). In some examples, the receiving controller is a controller that is different from the controller. In some examples, the receiving controller can look at a timeline of the received messages and aggregate data based on the timeline of the received messages. In some examples, the receiving controller disambiguates a payload message from a periodic status message by looking at an identifier that is sent with a message. In some examples, a message includes an identifier that indicates whether the message is a periodic status message or a payload message. In some examples, the receiving controller relates a particular payload message to a particular periodic status message by finding the respective index of the respective bit of periodic status message in the payload message. In some examples, the receiving controller relates a payload message to a particular periodic status message by identifying that a signal related to the periodic status message has transitioned from low to high or from high to low.

In some examples, the receiving controller receives a different periodic status message that is generated at another controller while receiving the periodic status messages. In some examples, in accordance with a determination that the different periodic status message is associated with (e.g., has and/or includes) the same bit sequence as a message in the periodic status messages, a determination is made that the different periodic status message and the periodic status message is related to each other; if not, not related. In some examples, in accordance with a determination that the different periodic status message is associated with a same bit sequence as a message in the periodic status messages, the respective index included in the payload message refers to the index of the masked bit in the different periodic status message as well as the message in the periodic status message; if not, the respective index included in the payload message does not refer to the index of the masked bit in the different periodic status message.

In some examples, in response to receiving the payload message, the receiving controller (and/or another device) causes an action to be performed. In some examples, the action is saving the relationship between the payload messages and the periodic status messages in a database. In some examples, the action is sending a notification to the user. In some examples, the action is not an action that causes a real-time operation of the device to adjust. In some examples, the action is not an action that causes a real-time operation of the device to adjust because not receiving a payload message should not impact (e.g., in some examples) the operation of a device since payload messages are not periodically resent by some controllers. In some examples, payload messages are not validated by a checksum operation to determine if the payload message was received by one or more controllers.

Note that details of the processes described above with respect to method 900 (i.e., FIG. 9) are also applicable in an analogous manner to method 1000 of FIG. 10. For example, method 1000 optionally includes one or more of the characteristics of the various methods described above with reference to method 900. For example, the executable code from method 1000 may be configured to establish a different recording service on each hardware device from method 900.

The foregoing description, for purpose of explanation, has been described with reference to specific examples. However, the illustrative discussions above are not intended to be exhaustive or to limit the invention to the precise forms disclosed. Many modifications and variations are possible in view of the above teachings. The examples were chosen and described to explain the principles of the techniques and their practical applications. Others skilled in the art are thereby enabled to best utilize the techniques and various examples with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

What is claimed is:

1. A method, comprising:
at a processor of an electronic device:
periodically sending status messages concerning a status of an event corresponding to the electronic device; and
at a first time while periodically sending the status messages:
in accordance with a determination that the status of the event has changed, sending a payload message concerning data other than the status of the event; and
in accordance with a determination that the status of the event has not changed, continuing to periodically send the status messages without sending the payload message.

2. The method of claim 1, wherein:
the status messages includes a first status message;
the first status message includes a respective bit at a respective index; and
the payload message includes an indication of the respective index.

3. The method of claim 2, further comprising:
processing a second status message concerning a second status of a second event that is different from the event, wherein the second status message does not include the respective bit at the respective index.

4. The method of claim 3, wherein:
the second status message is formatted with respect to a respective set of message conventions;
the first status message is formatted with respect to the respective set of message conventions; and
the payload message is not formatted with respect to the respective set of message conventions.

5. The method of claim 3, wherein the second event corresponds to the electronic device.

6. The method of claim 1, wherein:
the status messages includes a third status message;
the third status message includes a first bit at a first index and a second bit at a second index that is different from the first index;
the payload message includes an indication of the first index; and
a fourth message includes an indication of the second index.

7. The method of claim 1, wherein each of the status messages includes a masked bit that is at the same index in each of the status messages, and wherein the payload message includes an indication of the same index.

8. The method of claim 1, wherein the payload message is not periodically sent.

9. The method of claim 1, further comprising:
while periodically sending status messages concerning the status of the event corresponding to the electronic device, sending a fifth status message concerning a third status of a third event, wherein the fifth status message does not concern the status of the event.

10. The method of claim 1, wherein determining that the status of the event has changed includes detecting a rising edge of a signal or detecting a falling edge of the signal.

11. The method of claim 1, wherein the electronic device is coupled to other electronic devices in a wired network, and wherein the status messages and the payload message are sent to the other electronic devices via the wired network.

12. A non-transitory computer-readable storage medium storing one or more programs configured to be executed by one or more processors of an electronic device, the one or more programs including instructions for:
periodically sending status messages concerning a status of an event corresponding to the electronic device; and
at a first time while periodically sending the status messages:
in accordance with a determination that the status of the event has changed, sending a payload message concerning data other than the status of the event; and
in accordance with a determination that the status of the event has not changed, continuing to periodically send the status messages without sending the payload message.

13. An electronic device, comprising:
one or more processors; and
memory storing one or more programs configured to be executed by the one or more processors, the one or more programs including instructions for:
periodically sending status messages concerning a status of an event corresponding to the electronic device; and
at a first time while periodically sending the status messages:
in accordance with a determination that the status of the event has changed, sending a payload message concerning data other than the status of the event; and
in accordance with a determination that the status of the event has not changed, continuing to periodically send the status messages without sending the payload message.

14. The non-transitory computer-readable storage medium of claim 12, wherein:
the status messages includes a first status message;
the first status message includes a respective bit at a respective index; and
the payload message includes an indication of the respective index.

15. The non-transitory computer-readable storage medium of claim 14, further comprising:
processing a second status message concerning a second status of a second event that is different from the event, wherein the second status message does not include the respective bit at the respective index.

16. The non-transitory computer-readable storage medium of claim 15, wherein:
the second status message is formatted with respect to a respective set of message conventions;
the first status message is formatted with respect to the respective set of message conventions; and
the payload message is not formatted with respect to the respective set of message conventions.

17. The non-transitory computer-readable storage medium of claim 14, wherein the second event corresponds to the electronic device.

18. The non-transitory computer-readable storage medium of claim 12, wherein:
the status messages includes a third status message;
the third status message includes a first bit at a first index and a second bit at a second index that is different from the first index;
the payload message includes an indication of the first index; and
a fourth message includes an indication of the second index.

19. The non-transitory computer-readable storage medium of claim 12, wherein each of the status messages includes a masked bit that is at the same index in each of the status messages, and wherein the payload message includes an indication of the same index.

20. The non-transitory computer-readable storage medium of claim 12, wherein the payload message is not periodically sent.

21. The non-transitory computer-readable storage medium of claim 12, further comprising:
while periodically sending status messages concerning the status of the event corresponding to the electronic device, sending a fifth status message concerning a third status of a third event, wherein the fifth status message does not concern the status of the event.

22. The non-transitory computer-readable storage medium of claim 12, wherein determining that the status of the event has changed includes detecting a rising edge of a signal or detecting a falling edge of the signal.

23. The non-transitory computer-readable storage medium of claim 12, wherein the electronic device is coupled to other electronic devices in a wired network, and wherein the status messages and the payload message are sent to the other electronic devices via the wired network.

24. The electronic device of claim 13, wherein:
the status messages includes a first status message;
the first status message includes a respective bit at a respective index; and
the payload message includes an indication of the respective index.

25. The method of claim 24, further comprising:
processing a second status message concerning a second status of a second event that is different from the event, wherein the second status message does not include the respective bit at the respective index.

26. The electronic device of claim 25, wherein:
the second status message is formatted with respect to a respective set of message conventions;
the first status message is formatted with respect to the respective set of message conventions; and
the payload message is not formatted with respect to the respective set of message conventions.

27. The electronic device of claim 25, wherein the second event corresponds to the electronic device.

28. The method of claim 13, wherein:
the status messages includes a third status message;
the third status message includes a first bit at a first index and a second bit at a second index that is different from the first index;
the payload message includes an indication of the first index; and
a fourth message includes an indication of the second index.

29. The electronic device of claim 13, wherein each of the status messages includes a masked bit that is at the same index in each of the status messages, and wherein the payload message includes an indication of the same index.

30. The electronic device of claim 13, wherein the payload message is not periodically sent.

31. The electronic device of claim 13, further comprising:
while periodically sending status messages concerning the status of the event corresponding to the electronic device, sending a fifth status message concerning a third status of a third event, wherein the fifth status message does not concern the status of the event.

32. The electronic device of claim 13, wherein determining that the status of the event has changed includes detecting a rising edge of a signal or detecting a falling edge of the signal.

33. The electronic device of claim 13, wherein the electronic device is coupled to other electronic devices in a wired network, and wherein the status messages and the payload message are sent to the other electronic devices via the wired network.

* * * * *

UNITED STATES PATENT AND TRADEMARK OFFICE
CERTIFICATE OF CORRECTION

PATENT NO. : 12,047,228 B2
APPLICATION NO. : 18/213677
DATED : July 23, 2024
INVENTOR(S) : Ramy R. Asselin et al.

It is certified that error appears in the above-identified patent and that said Letters Patent is hereby corrected as shown below:

In the Specification

IN DETAILED DESCRIPTION:

Under Column No. 10, Line No. 12: "event identifier 304", should read: --event identifier 304a--;

Under Column No. 14, Line No. 55: "the status of the status of", should read: --the status of--.

Signed and Sealed this
Seventeenth Day of September, 2024

*Katherine Kelly Vidal*

Katherine Kelly Vidal
*Director of the United States Patent and Trademark Office*